(12) United States Patent
Baldwin (10) Patent No.: US 8,974,045 B2
(45) Date of Patent: Mar. 10, 2015

(54) PHASE-CHANGE INK JETTING

(75) Inventor: Howard T. Baldwin, Downers Grove, IL (US)

(73) Assignee: FUJIFILM Dimatix, Inc., Lebanon, NH (US)

( * ) Notice: Subject to any disclaimer, the term of this patent is extended or adjusted under 35 U.S.C. 154(b) by 537 days.

(21) Appl. No.: 13/086,077

(22) Filed: Apr. 13, 2011

(65) Prior Publication Data

US 2012/0262520 A1  Oct. 18, 2012

(51) Int. Cl.
*B41J 2/175* (2006.01)
*G01D 11/00* (2006.01)
*C09D 11/322* (2014.01)
*C09D 11/34* (2014.01)

(52) U.S. Cl.
CPC ........... *B41J 2/17593* (2013.01); *C09D 11/322* (2013.01); *C09D 11/34* (2013.01)
USPC .............................................. 347/88; 347/99

(58) Field of Classification Search
None
See application file for complete search history.

(56) References Cited

U.S. PATENT DOCUMENTS

| | | |
|---|---|---|
| 3,444,732 A | 5/1969 | McKinley et al. |
| 3,981,761 A | 9/1976 | Kojima et al. |
| 4,292,103 A | 9/1981 | Namura et al. |
| 4,751,528 A | 6/1988 | Spehrley, Jr. et al. |
| 4,775,232 A | 10/1988 | Fischbeck et al. |
| 4,801,473 A | 1/1989 | Creagh et al. |
| 4,814,786 A | 3/1989 | Hoisington et al. |
| 4,864,330 A | 9/1989 | Creagh et al. |
| 4,873,134 A | 10/1989 | Fulton et al. |
| 4,877,676 A | 10/1989 | Creagh et al. |
| 4,951,067 A | 8/1990 | Spehrley, Jr. |
| 4,971,408 A | 11/1990 | Hoisington et al. |
| 5,003,322 A | 3/1991 | Creagh et al. |
| 5,023,111 A | 6/1991 | Fulton et al. |
| 5,043,741 A | 8/1991 | Spehrley, Jr. |
| 5,105,204 A | 4/1992 | Hoisington et al. |
| 5,114,747 A | 5/1992 | Fulton et al. |
| 5,172,135 A | 12/1992 | Creagh et al. |
| 5,182,571 A | 1/1993 | Creagh et al. |
| 5,281,442 A | 1/1994 | Fulton et al. |
| 5,337,079 A | 8/1994 | Spehrley, Jr. et al. |
| 5,378,313 A | 1/1995 | Pace |
| 5,910,810 A | 6/1999 | Brooks et al. |
| 5,980,981 A | 11/1999 | Fulton et al. |
| 5,992,320 A | 11/1999 | Kosaka et al. |
| 5,992,991 A * | 11/1999 | Kanemoto et al. ............... 347/88 |
| 6,149,747 A | 11/2000 | Lorenz et al. |
| 6,165,659 A | 12/2000 | Kamada et al. |
| 2002/0056509 A1 | 5/2002 | Miura et al. |
| 2002/0063762 A1 | 5/2002 | Haan et al. |
| 2002/0144627 A1* | 10/2002 | Doyle et al. ............... 106/31.61 |

(Continued)

FOREIGN PATENT DOCUMENTS

WO  WO 2013/074251  5/2013

OTHER PUBLICATIONS

International Search Report and Written Opinion in International Application No. PCT/2012/033243, dated Oct. 24, 2012 by S. B. Kim, 12 pages.

(Continued)

*Primary Examiner* — Geoffrey Mruk
(74) *Attorney, Agent, or Firm* — Fish & Richardson P.C.

(57) ABSTRACT

Among other things, ink is jetted onto a substrate, the ink includes (a) a pigment and (b) a wax, and the jetted ink on the substrate is heated to fire the pigment on the substrate.

38 Claims, 4 Drawing Sheets

(56) References Cited

U.S. PATENT DOCUMENTS

| | | |
|---|---|---|
| 2005/0150412 A1 | 7/2005 | Geddes et al. |
| 2006/0284929 A1 | 12/2006 | Matsuzawa et al. |
| 2008/0098927 A1 | 5/2008 | Allen et al. |
| 2008/0196621 A1 | 8/2008 | Ikuno et al. |
| 2008/0210122 A1* | 9/2008 | Magdassi et al. .......... 106/31.05 |
| 2013/0129994 A1 | 5/2013 | Wells, Jr. |

OTHER PUBLICATIONS

"List of glues", retrieved from http://en.wikipedia.org/wiki/List_of_glues on Jun. 23, 2011 at 10:02, 2 pgs.

International Search Report and Written Opinion in International Application No. PCT/US2012/061434, dated Mar. 29, 2013, 13 pages.

* cited by examiner

PHASE-CHANGE INK JETTING

BACKGROUND

This description relates to phase-change ink jetting.

In some kinds of ink jetting systems, the ink (sometimes called a hot melt ink) includes a dye or pigment held in a medium such as wax that is in a solid phase at room temperature. For jetting, the ink is heated to change the wax to a liquid state that can be jetted through a jetting orifice onto a substrate from an inkjet pressure chamber. Such inks can be shipped from the vendor to the place where the jetting is done in the form of a solid, easy to handle puck. For use, the puck is loaded into a chamber where it is heated to melt the wax, and the liquid ink can then be delivered along an ink pathway to the orifice and onto the substrate. Heaters (and related thermocouples for control purposes) can be provided at places along the ink pathway to keep the ink melted while jetting is going on. If the jetting system is turned off, and returns to room temperature, the ink solidifies. Later, the heaters can be used to melt the ink to permit jetting again.

Some known hot melt inks were jetted at 125° C. and at a viscosity of 20 centipoise (cps) and contained pigments. Such hot melt inks were solid at room temperature and were heated or cooled rapidly to transition back and forth between solid and liquid phases to prevent separation of the pigments from the medium. Many of the pigments were typically made from dyes reacted with polymers and then ground up into particles so that their density was low compared to titanium dioxide, for example. Carbon black, which is not a dye, has also been used as such a pigment.

It is known to force cool transparencies after printing with hot melt ink to keep the ink from crystallizing, which would impair its transparent qualities.

SUMMARY

The examples that we describe later exhibit one or more of the following aspects and features.

In general, in an aspect, ink is jetted onto a substrate, the ink includes (a) a pigment and (b) a wax, and the jetted ink on the substrate is heated to fire the pigment on the substrate.

Implementations may include one or more of the following features. The pigment includes dense particles. The pigment includes an earth pigment. The substrate includes a material that can be fired in a kiln. The substrate includes a ceramic or a glass. The wax is in a solid phase at room temperature. The ink is jetted in a pattern including at least one of an image, text, or graphic. The jetted ink is heated to a temperature or at least 120° C. The wax is liquid during the jetting. After the jetting and before the pigment has substantially separated from the wax within the ink, the wax is caused to change from a liquid state to a solid state. Before the jetting, the wax is caused to change from a solid state to a liquid state.

In general, in an aspect, an inkjet printing system includes an inkjet head including an ink pathway from a source of ink to orifices from which ink is to be jetted onto a substrate. A thermal structure is thermally coupled to the ink pathway in at least some places along the pathway to add or remove thermal energy to or from the ink pathway to cause phase changes of the ink between a liquid phase and a solid phase. A supply of ink includes dense pigment and a medium that have a solid phase at room temperature and a liquid phase at a higher-than-room temperature.

Implementations may include one or more of the following features. The supply of ink is held in a reservoir coupled to the head. A controller causes the thermal structure to change the phase of the ink from a liquid phase to a solid phase after the jetting of ink onto the substrate. The thermal structure is capable of cooling elements along the ink pathway to cause the ink to change phase from a liquid phase to a solid phase.

In general, in an aspect, an ink jet printing system includes an ink pathway between a source of ink and orifices from which ink is to be jetted onto a substrate. A cooling structure is thermally coupled to the ink pathway in at least some places along the pathway to cool ink within the pathway to cause the ink to change from a liquid phase to a solid phase after jetting.

Implementations may include one or more of the following features. A controller triggers the cooling structure to cause the phase change to occur no later than 300 seconds after the jetting. A controller triggers the cooling structure to cause the phase change to occur quickly enough to prevent substantial settling of pigment within the ink.

In general, in an aspect, in a set of phase changing jetting inks, each of the phase changing jetting inks includes (a) (i) particles that have a density of at least 4.5 g/cm$^3$ and that form a fired non-white color when heated to around 1200° C. on a substrate on which the ink is to be jetted, the fired colors of the respective jetting inks being different or (ii) particles that have a density of at least 6 g/cm$^3$ and that form a fired white color when heated on a substrate on which the ink is to be jetted, and (b) a medium that changes phase from liquid to solid at a temperature between 40° C.-120° C. The inks are jettable to form a multicolor tired design on the substrate when fired. Phase changing jetting inks that form a fired white color (other than from titanium dioxide) when heated to around 1200° C. on a substrate include particles that have a density of at least 7 g/cm$^3$.

Implementations may include one or more of the following features. The particles include earth pigments. The particles include at least one of spinel iron-chromium-zinc, soluble or insoluble gold complexes/salts, tin-chromium oxide, zirconium praseodymium yellow, yellow titanates, spinel iron-chrome-zinc-alumina, cobalt-alumina or cobalt-silica and cobalt-chromium-alumina, spinel iron-chromium-cobalt. The medium includes wax.

In general, in an aspect, in a pattern of one or more inks that is jetted onto a surface of a ceramic or glass substrate, each of the inks includes (a) (i) particles that have a density of at least 4.5 g/cm$^3$ and that will form a corresponding non-white color when fired or (ii) particles that have a density of at least 6 g/cm$^3$ and that will form a corresponding white color when fired, and (b) a wax medium that changes phase from liquid to solid at a temperature in the range of 40° C.-120° C. The substrate is heated to tire the pattern on the surface of the substrate.

Implementations may include one or more of the following features. The jetting includes jetting a multi-color pattern of inks. The particles include earth pigments. The particles include at least one of: spinel iron-chromium-zinc, soluble or insoluble gold complexes/salts, tin-chromium oxide, zirconium praseodymium yellow, yellow titanates spinel iron-chrome-zinc-alumina, cobalt-alumina or cobalt-silica and cobalt-chromium-alumina, spinel iron-chromium-cobalt and/or other such ceramic pigments. Depending upon the design of the tile; a variety of ceramic pigments may be required (we use the phrase ceramic pigments to refer to pigments that are used on ceramic substrates). An inkjet head is a unit that includes an array of inkjets and associated pressure chambers. Each color of the multi-color pattern of inks can be associated with a corresponding inkjet head. The ceramic pigments typically include particles that will form a brown color on the substrate and in some cases one or more of: red, pink, yellow, beige, blue, greenish blue and black.

White can also be used if the base color of the tile is not white. Heating the substrate to fire the pattern includes heating the substrate in a kiln. Before the jetting, the wax medium is heated to change it from a solid phase to a liquid phase. After the jetting, the wax medium is cooled to change it from a liquid phase to a solid phase. The same pattern is jetted onto a series of substrates, then the medium is forced to change from a liquid state to a solid state within an inkjet system that is doing the jetting. Later, the medium is caused to change from a solid state to a liquid state. Then, a different pattern is jetted onto a series of substrates.

In general, in an aspect, an ink that is in a liquid phase and that is jetted from an inkjet onto a substrate includes particles that can be fired on the substrate and have a density of at least 4.5 g/cm$^3$. After the ink has been jetted, ink in the inkjet is caused to change to a solid phase to reduce settling of the particles in the liquid phase. Later, the ink in the inkjet is caused to change to the liquid phase again, and ink is jetted from the inkjet onto another substrate.

In general, in an aspect, a wax-based ink in an inkjet printing system is forced to change from a liquid state to a solid state within no more than a predetermined period after the inkjet printing system has jetted ink onto a substrate.

Implementations may include one or more of the following features. The predetermined period is less than 300 seconds.

These and other aspects, features, and implementations, and combinations of them, can be expressed as methods, compositions of matter, apparatus, systems, program products, means and steps for performing functions, methods of doing business, and in other ways.

Other aspects and features will become apparent from the following description and from the claims.

DESCRIPTION

In at least some of the examples that we describe below, ink that is to be jetted onto a substrate includes a pigment and a medium (such as wax) that is caused to change phases between solid and liquid between times when the ink is not being jetted and times when it is being jetted, respectively. In some implementations, the pigment includes dense particles. By freezing the medium (changing it to the solid phase) at times or during periods when jetting is not going on, the dense particles can be entrained in the medium which helps to slow or stop the tendency of those particles to sink and separate from the medium, and reduces the opportunity for these particles to separate within the medium, which would make the jetting of the ink (including the pigment) difficult during the next jetting session and could cause clogging in the printhead.

In some cases that we describe below, the pigment includes particles that can be fired, for example, in a kiln. We take advantage of that feature, in some examples, by using such inks to lay down decorative patterns on a substrate that can tolerate firing in a kiln. The substrate could be, for example, a glass or ceramic tile, either in the unfired green state or in a fired state. After the pattern is laid down, the substrate with the pattern is fired. The high heat required for firing drives off the medium and fires the pattern permanently on the surface of the substrate. Because the patterns that are to be laid down on the substrate can be changed frequently, for example, as frequently as for each individual unit of the substrate (that is, in a "lot of one" mode), such a printing and firing sequence can save money and time.

In our discussion, we use the term jetting broadly to include, for example, any forcing of ink from an orifice and onto a substrate, including drop on demand systems. We mean to include, but not be limited to, a wide variety of ink jetting systems and the inkjet heads that are part of them, including those that now exist and may be developed in the future.

We use the term substrate also broadly to include, for example, any workpiece onto which ink is jetted. Sometimes the work piece is a glass or ceramic item on which a pattern or image or text is to be laid down and fired. But the work piece could be any kind of material in any form, phase, shape, size, weight, density, or configuration, for example, that can accept the laying down of an ink jetted pattern.

When we refer to a pigment, we intend to include, broadly, any kind of material in an ink that provides a color or colors or other characteristic or quality on a substrate on which ink is jetted. Often, the pigment will be comprised of what might be called particles, but any kind of pigment that is subject to separation, or sedimentation, or settling within a matrix of the ink of which the pigment is part, would be included in the term, among other things. In some cases, a pigment is referred to as an earth pigment, by which we mean to include pigment derived from naturally occurring substances, such as rock and other hard materials. As we discussed below, a pigment can provide color to an ink, but a pigment in our way of using the term could also include particles that provide other characteristics, such as a glaze or frit (in a continuous layer, a large-scale pattern or a small-scale pattern or texture) when applied to a substrate and fired, for example.

We use the term ink in a broad sense to include any material that includes a medium and a pigment and that in some phase or state can be jetted from an inkjet.

By the term color, we mean any color in the spectrum, and black, white, and gray-scale.

We use the term medium in a very broad sense to include any material in which the particles or other elements that make up a pigment are entrained or mixed or held. Often, when we refer to medium we mean a material that is, at least at some times and in some circumstances, in a form in which the elements that make up the pigment may separate and not be evenly distributed or dispersed within the medium. At other times or in other circumstances, the elements that make up the pigment are evenly distributed or dispersed within the medium.

When we use the term way, we include broadly any kind of traditional or non-traditional wax and any artificial or natural wax and also any other material (whether or not called a wax) that undergoes a reversible phase change from solid to liquid at a temperature that is in the range of, for example, 40° C.-120° C. Typical waxes melt between 40° C.-80° C. Materials that undergo phase changes at other temperatures and in other temperature ranges are also included in our use of the word wax. In the liquid phase, the wax can carry particles of a pigment and be jetted with the pigment onto a substrate. In the solid phase, the wax restrains the settling of particles that are entrained in the wax. When we use the term wax we include materials that comprise a single wax or any mixture of waxes in any proportions.

When we refer to a separation of materials (for example a separation of dense particles from a medium in which they are entrained), we mean to include, for example, any settling, separation, dissociation, diffusion, or other process by which the uniformity of distribution of one material in another is reduced. For example, dense particles of a pigment may separate within a liquid medium, but not within a solid medium.

We use the term fire broadly to include, for example, applying high heat to cause particles to melt and form a mass that, when cooled, forms a hard material such as permanently on a substrate. In some examples, firing includes the high heating that occurs in a kiln. High heat can include heating to a temperature that is in the range of 550-1350° C. For example, kilns for overglaze or china painting can operate at temperatures between 550° C. and 800° C., or between 586 C to 763° C., kilns for glass firing can operate at temperatures between 750° C. to 950° C., for example between 757° C. to 915° C., kilns for low fire ceramics can operate at temperature between 950° C. to 1200° C., for example between 981° C. to 1154° C., kilns for mid fire ceramics can operate between 1100° C. to 1300° C., for example between 1112° C. to 1257° C., and high tire ceramics can operate at temperature between 1200° C. to 1350° C., for example between 1211° C. to 1305° C. In some examples, the mass is formed from something that might not be called particles and the something from which the mass is formed may not require heating as hot as the temperature range just mentioned.

In the term ink pathway, we broadly include, for example, any pathway along which liquid ink flows from a source or reservoir or supply of ink to a place where the ink is jetted or dispensed or used, among other things. The pathway might also include a portion along which excess ink is returned to a source or reservoir. We tend to use the words source, reservoir and supply interchangeably with respect to ink.

We use the term freeze to include, for example, cooling a material so that it undergoes a phase change from liquid to solid. The cooling could occur naturally as heat is dissipated into a cooler ambient, or could be caused deliberately by cooling equipment. Before the ink or the medium is fully frozen, there exists an intermediate state of quiescence in a temperature range between the melting point of the medium and the jetting temperature of the ink in which the medium exists in a mixture state between the solid phase and the liquid phase. In this quiescent state, ink pigments can separate from the medium, but such separation does not occur rapidly.

In using the term orifice, we broadly include, for example, any opening at the end of an ink pathway through which ink is jetted towards a substrate.

When we use the term thermally coupled, we mean to include broadly any arrangement to, for example, permit heat to flow readily.

We use the term particles broadly to include, any kind of for example, elements of a material that have a size in the range of hundreds of nanometers (nm). A typical graphics pigment has particles that are about 100 nm but in an ink the graphics pigments can have sizes that range from well under 100 nm to over 1 micron. Ceramic pigments, on average, are larger. Examples of such ceramic pigments include finely ground ceramic pigments having small or sub-micron particles. The ground up pigments often have a distribution of particle sizes, so even though many pigment particles are sub-micron, in some cases an absolute filter is used to ensure that particles larger than, for example, 5 micron would not pass through the filter to enter a printhead. A system capable of jetting larger ceramic pigments, and keeping these pigments dispersed would be very desirable for ceramic tile decoration. Nonetheless, in addition to the weight of ceramic pigments being approximately twice that of graphics pigments, a given volume of ceramic ink contains approximately twice the amount of pigments compared to graphics pigment (we use the phrase ceramic ink to refer to ink that contains ceramic pigments that are used on ceramic substrates). Thus, for a given volume of ceramic ink, there is twice the amount of ceramic pigments compared to the amount of graphics pigment in graphics ink, and the ceramic pigments weigh twice as much as graphic pigments. As a result, the density of ceramic ink is approximately four times the density of graphic ink.

By a dense pigment, we mean broadly any pigment, for example, the particles of which have a density of at least 4.5 $g/cm^3$ and form a fired non-white color when heated on a substrate, or the particles of which have a density of at least 6 $g/cm^3$ and form a tired white color when heated on a substrate.

By room temperature, we mean a temperature in the range of 65° to 75° F. or ambient temperature.

Figure 1:
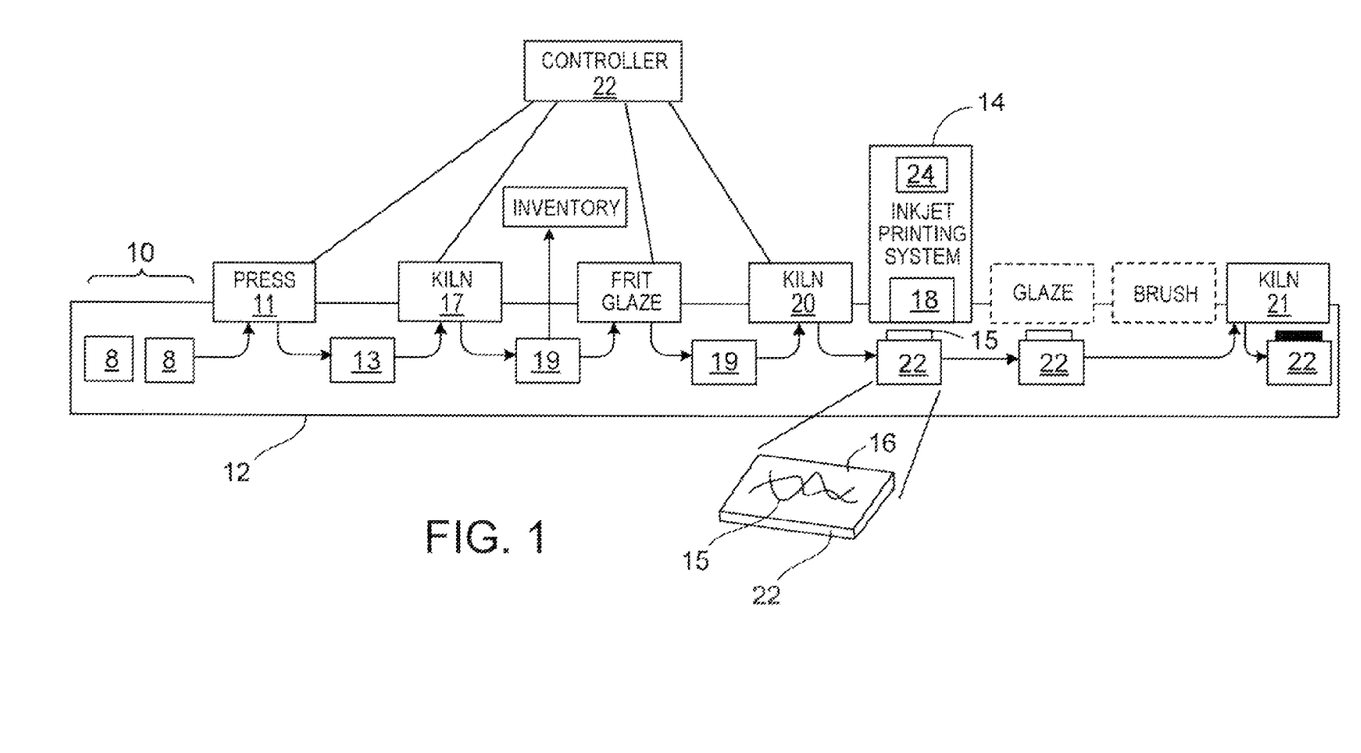
FIG. 1 is a schematic view of a printing line.

When a material undergoes a phase change, for example, from liquid to solid or solid to liquid, a delay occurs until the change has been completed. We sometimes refer to this delay as a phase change delay. How short the phase change delay ought to be will depend, of course, on the constituents of the ink, and, in particular, on how fast the separation of the pigment from the medium happens, and on how much separation can occur without degrading printing quality unacceptably. An intermediate state of quiescence exists in a temperature range between the melting point of the medium and the jetting temperature of the ink in which the medium exists in a mixture state between the solid phase and the liquid phase. In this quiescent state, the medium is not frozen and ink pigment can separate from the medium, but such separation does not occur rapidly. The ink in the inkjet head is held in such a quiescent mode to allow the medium to be heated up quickly when the ink is to be jetted As shown in FIG. 1, in some examples of the concepts that we are describing here, formed units of a powder mixture 8 that include clay, water, and earth materials are shown as discrete precursor workpieces 10. The workpieces, which will eventually become part of finished ceramic tiles, enter a processing line 12 (for example, they may be carried along on a conveyor). These precursor units of powder mixture 8 are processed using a press 11 that exerts a pressure of, for example, about 400 pounds per square inches on each of the precursor workpieces 10, to yield wet green tiles 13, which have a 5-10% water content, for example. The wet green tiles 13 may be squares having sides of 700 mm. Along the processing line 12, a first kiln 17 operating at 200° C. receives the wet green tiles 13 and dries them into ceramic tiles 19. The ceramic tiles 19 may be sent to an inventory 23 or sent further along the processing line 12 for decoration.

Ceramic tile decoration, in this example, includes one or more steps of glazing, printing, and using brushes to create grooves or texture in the tiles 19. Further along the processing line 12, at a fit glaze station 25, frit, which are small glass particles, are flood coated (deposited) on ceramic tiles 19. The frit particles are fired into a frit glaze in a second kiln 20. The frit glaze seals the ceramic tiles 19 and creates a glossy finish on the tiles to form substrate units 22 which can accept printing of a pattern. One or more of analog and digital printing or a combination of them may be used on the substrate units 22. In analog printing, a silicone drum deposits ceramic pigments on the substrate units 22. A rotary screen can also be used in analog printing.

Digital printing can use an ink jet printing system 14 that lays down a two-dimensional pattern 15 on an exposed upper surface 16 of each of the substrate units 22. The pattern 15 is laid down by jetting ink from orifices of one or more inkjets of one or more inkjet heads 18 that are part of the ink jet printing system, in accordance with a desired pattern. Among a wide variety of other possibilities, the pattern that is laid down can include one or more colors and represent decorations, text, images, or graphics, among other things.

After printing, substrate units 22 may go through a second glazing station 27 where additional frit may be flood coated or deposited on the substrate units 22, in some cases selectively. Such a glaze adds depth to the color printed on the substrate units 22 earlier in the processing line. In addition, various types of brushes can be optionally used to create textures and designs on the substrate units 22.

In some examples, the ink that is jetted to form the pattern is formulated as a combination of a wax and a dense pigment that can be fired. Of course, a wide variety of other components can be included in the formulation of the ink for a variety of purposes. In the case of ceramic pigments, the wax (or a mixture of waxes) comprises the major component of the ceramic ink.

For example, a ceramic ink may contain ceramic pigments in the range of 3-15% by volume of the finished ink (dependent, for example, on the type of ceramic, and the inkjet system capability) and a dispersing agent that binds onto the pigments (to keep the pigments separated when the wax is molten). In some cases, a resin may be used as the dispersing agent. There are, however, cases in which the dispersing agent will have no value in fixing the wax on certain tiles prior to firing in the kiln. Additional components may be used in formulating the ink. Anti-oxidants, which are used in some graphics wax formulations, may not be needed in a ceramic ink formulation because the wax used for ceramic pigments will be burned off during the firing process. Suitable inks may be available as formulated by commercial ink vendors including Tektronix/Xerox in Beaverton/Wilsonville Oreg., Sunjet/Sun Chemical in Bath, U.K., and Markem Imaje in Keene N.H.

Ceramic ink formulation may not include some of the components used in graphics wax formulations. Graphic wax formulations include a colorant; either dyes or pigments; a wax; or a mixture of waxes depending on the application; a dispersing agent that binds onto the pigment and keeps the pigment from clumping, separating from the wax, or settling; an anti-oxidizing agent that keep the wax from aging (for example, from turning yellow); and an adhering resin that allows the wax to stick to the intended substrate.

A ceramic wax may have other properties/requirements and may not include adhering agents and anti-oxidizing agents. In a graphics wax formulation; the graphics pigments (generally cyan, yellow, magenta and black) make up 2-5% of the formulation by volume. In a ceramics ink; the ceramic pigments may be in the range of 4% to over 10% by volume except ceramic white which could an even higher volume percentage in the ceramic wax formulation. The dispersing agent may be mixed with the ground up pigment before the mixture is combined with the carrier (we sometimes use the word carrier interchangeably with medium). Sometimes a surfactant is added so that the ink better wets the substrate.

In examples in which the substrate is ceramic, the pigments are typically dense (heavy). Most ceramic pigments are 2 to 4 times denser than what are known as graphics pigments and are very much denser than the dyes in dye-based inks, which have almost the same density as water. White, titanium dioxide, is the densest graphics pigment at about 4.5 $g/cm^3$. Black (generally carbon black) is less dense, at about 2 $g/cm^3$. Most other graphics pigments, primarily cyan, yellow and magenta, have a density of 2 $g/cm^3$ or less. White ceramic pigment is 3-4 times denser than graphics pigments and at least 40% denser than titanium dioxide (a graphics white pigment that is not used as a ceramic pigment). Ceramic pigments typically have densities in the range of 4.5 to 6 $g/cm^3$ although in some cases the densities could be lower or higher than that range. Examples of earth pigments used as ceramic pigments are the following: yellow: zirconium praseodymium yellow; beige: beige spinel iron-chromium-zinc-alumina; brown (most commonly used): spinel iron-chromium-zinc brown; blue can be cobalt-alumina or cobalt-silica; red: soluble or insoluble gold.

By contrast, certain graphics pigments (primarily cyan, yellow, magenta and carbon black) have densities of approximately 2 to 2.5 $g/cm^3$ or less, and graphics white in the form of titanium dioxide ($TiO_2$) has a density of about 4.5 $g/cm^3$.

In some production lines, the workpieces can be moved past the inkjet printing system in a row, as suggested in FIG. 1, or in any of a variety of other ways. Among others, a set of workpieces that are arranged side-by-side can all be delivered past the inkjet printing system at one time followed by another set and so on. A wide variety of other arrangements are possible.

At some point after the patterns are laid down, the workpieces proceed along the processing line into a third kiln 21, where the workpieces are heated to a high temperature, that is, they are fired.

The firing of the workpieces in the kiln causes the wax to evaporate or burn off and then the pigment to be fired into a permanent pattern that lies on, is attached to, or becomes an integral part of the top surface of the workpiece. The third kiln 21 operates at temperatures above 1000° C., typically above 1200° C. The third kiln 21 may have a length that is at least 50 m, or it may also be over 100 m. Additional processing steps can be included after the kiln 21 for various purposes, such as an optional polishing, and, following those steps, the fired workpieces can be removed from the line and put into commerce.

The processing line 12 may also include an electronic or programmed controller used to control the progress of the workpieces along the processing line, the operation of the printing system, the operation of the kiln, and potentially a wide variety of other aspects of the operation of the processing line.

The inkjet printing system 14 may include an ink phase changing system 24 that includes elements that are designed to promote phase changes between solid and liquid in the ink that is used in the inkjet printing system. In some cases, the ink phase changing system 24 is designed only to promote phase changes in one direction, for example, from liquid to solid, by cooling one or more elements along the ink pathway within the inkjet printing system. These elements can include, for example, a main reservoir of ink, conduits that carry ink from the main reservoir to an array of inkjet heads, a local reservoir associated with the inkjet heads, or with individual inkjet heads, with conduits that carry ink from the local reservoir to the inkjet head, and with conduits and other elements of a recirculation system that carry unused or waste ink in a return path from the inkjet head to the local reservoir or from the local reservoir to the main reservoir. Within a given inkjet head, the cooling elements may be associated with the inkjet pressure chamber, the orifice, and any of the other elements that comprise the inkjet head.

An inkjet head typically contains 3-20 $cm^3$ of wax and the main reservoir contains more wax than the inkjet head. The volume of wax influences the time needed to achieve freezing or melting. The ink freezing temperature varies depending upon the melting point of the ink. If the melting point of the ink is between 70-80° C., the ink can begin freezing (solidifying) when the heater is turned off, as soon as the ink gets below its melting point. As the viscosity increases, due to the solidification, the pigments become more stable until it is fully frozen in place. If no additional freezing aid is applied;

the ink in the inkjet head will generally freeze within four to ten minutes depending upon the volume of ink in the inkjet head.

Freezing of the wax in the inkjet head needs to controlled to reduce damage to the inkjet head that can occur if freezing of the wax occurs too quickly. For example, the ink may crystallize when frozen too quickly, and the ink also shrinks as it crystallizes, giving rise to cracks and voids in the block of crystallized ink. The crystallized ink block also may pull off and damage conformal coatings on the inkjet head, such as parylene coatings.

The cooling done by the ink phase changing system may be done using a cooling fluid passed through conduit, by air cooling, or by any other approach that will produce a sufficiently short ink phase change delay, or by any combination of them. Using a muffin fan to blow ambient air onto the inkjet head can decrease the freezing time of the wax from ten minutes to three minutes. By using a freezing agent, such as Freon™, the wax can be frozen in approximately one minute which may not cause damage to the head. Often, the ink phase change system, or parts of it, will need to be thermally coupled to corresponding elements of the inkjet printing system, for example, by being incorporated into them or attached to them.

The controller 22 can be configured to control the ink phase change system in coordination with control of the inkjet printing system. For example, suppose that the inkjet printing system is printing a pattern on a succession of substrate units and the run is nearing completion. Suppose that the production line 12 will be stopped then for awhile to permit changes in the workpieces, the pattern, or combinations of them. When the final workpiece of the current run has passed through the inkjet printing system, and the system is not required to use the inkjet printing system to decorate more workpieces, the controller could trigger operation of the ink phase change system to promptly cool the ink in the inkjet printing system to force a phase change from liquid to solid when the system is no longer in use and is to be shut down. By sizing the cooling capacity of the phase change system appropriately, triggering the operation of the ink phase change system will cause the phase change to occur with a phase change delay that is short enough to prevent separation of the pigment from the medium to an extent that would degrade the printing unacceptably. In some cases, the phase change can be effected at different times and with different speeds in different parts of the inkjet printing system, to achieve the desired result. In some cases, a particular profile of cooling could be obtained over a short period of time and in different parts of the inkjet printing system, again to achieve a desired result.

The speed and staging of the phase change from liquid to solid can be designed empirically based on the design of the inkjet printing system and the formulation of the ink being used.

In some cases, the forced cooling might be achieved by a freeze jet, for example, by blowing cold air or Freon on the inkjet head. As the wax cools and before it freezes, the wax gets more viscous, and the higher viscosity of the wax slows the rate of pigment separation.

Besides the freezing of the wax based inks, the higher viscosity, 20 cps, during jetting would slow the settling of the pigments. The higher the viscosity, the longer the time taken for particles to settle. It is beneficial to have ink viscosity of 20 cps than for example 1-2 cps, when jetting. As the ink is cooled before it freezes, the viscosity continues to rise, further slowing the settling of particles. (see FIG. 4 for change in viscosity as a function of temperature).

An off-head system (OHS), if used to deliver ink from a reservoir to the head, in some examples may not need a quick freeze, because it typically will have an agitation system (used only when the wax is hot). Reservoirs (not heads) typically have an agitation (mixer) in the reservoirs, which are often a meter away from the heads and fed by umbilicals. These OHS reservoirs hold a larger amount of wax-based ink (for example, between 30 $cm^3$ to many hundreds of $cm^3$ and may even hold kilograms of wax—we sometimes use the word wax to refer to the ink that uses a wax medium) than the inkjet head. In some examples, when agitation is not done or for other reasons, the reservoir may need to be force cooled also. Ink in a heated umbilical freezes very quickly once heat (for example a heated umbilical threaded into the ink tubing) is turned off. This happens in under a minute from over 40-80° C. to full freeze without any aid.

One can be more aggressive freezing this ink by using cold plates or air conditioners to aid in capturing the heavy ceramic pigments in place more rapidly. In addition, the ink in the OHS reservoir does not need to be kept at the jetting temperature, but only at the ink's melting point which is sufficient for pumping to the head. Therefore, freezing of the ink in the OHS reservoir can be more rapid and aggressive. Moreover, the OHS reservoir typically does not contain conformal coatings, and can thus withstand more rapid and aggressive cooling (and the formation of splits and gaps) compared to the inkjet head.

Although we have discussed an ink phase change system 24 that changes the phase of the ink from liquid to solid, of course, the ink phase change system could be one that changes the phase from solid to liquid, or one that is capable of doing both jobs in any sequence and with any desired speed in any selected parts or all of the inkjet printing system. A purge may be part of the startup routine for the inkjet head to force ink out of the orifices and collect it as waste ink at a maintenance station (not shown).

Figure 4:
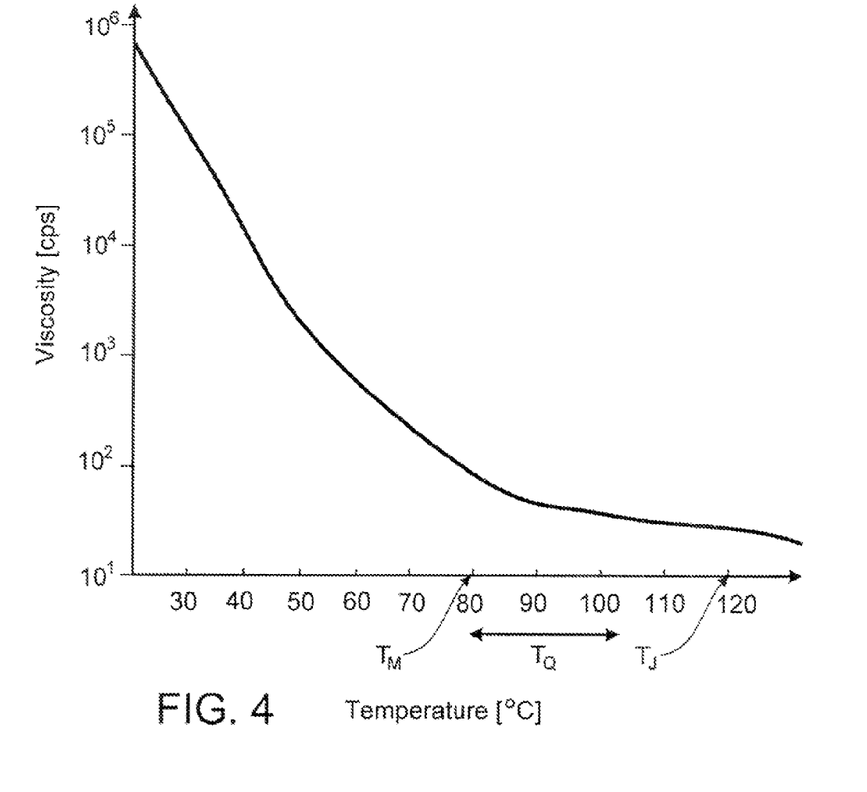
FIG. 4 is a temperature viscosity graph.

FIG. 4 shows a schematic viscosity-temperature graph, adapted from http://www.argueso.com/uploads/Tech_Pub_Rheology.pdf. Such a viscosity-temperature graph contains information that influences the selection of the operating temperature of the inkjet printing system. For example, the timing of freezing and melting is determined based on the information of such a graph.

In the example illustrated in FIG. 4, the melting temperature $T_M$ of the wax is 78° C., and indicated in the figure as $T_M$. In some examples, ink is jetted at a higher temperature $T_J$, for example, at 110° C. up to 150° C. but typically about 125° C. The jetting temperature is selected based on the viscosity required by the inkjet head and the melting point of the wax. The viscosity is plotted on a logarithmic scale, indicating that large changes in viscosity occur over a comparatively small range of temperature.

The melting point $T_M$ for inks having low melting point waxes is in the range of 40-50° C. while waxes with high melting point have $T_M$ over 80-90° C. Various waxes can be mixed to achieve a composite wax having a selected melting point. A typical melting point of the wax can be 40° C.-80° C. depending on the type of wax used so the typical freezing starts just below the melting point.

Viscosity of the ink to be jetted is typically 10-20 cps but can be higher or lower, for example, between 5-30 cps. It is important to prepare the ink to be jetted to a viscosity suitable for the printhead. If the viscosity of the jetted ink is much higher than 30 cps (e.g., 50 cps) or much lower than 5 cps (e.g., 2 cps), the high (or low) viscosity of the ink can cause jetting abnormalities that create tails (satellites), and affect the velocity and direction of travel of the drop.

In some examples, a state of quiescence within the temperature range $T_Q$ in which the wax exists in a mixture state between the solid and liquid phase occurs between $T_M$ and $T_J$. In this quiescent state, ink pigment can separate from the wax, but such separation does not occur rapidly. The ink in the inkjet head is held in such a quiescent mode to allow the wax to be heated up quickly when the ink is to be jetted.

Continuing our example above, while the ink is in the frozen (solid) state in the inkjet printing system, and before the next run of inkjet printing occurs, the frozen ink must be liquefied. This could be done by turning off the cooling provided by the ink phase change system, which may allow the ink to rise to the ambient temperature and melt, or could be done more aggressively by deliberate heating. Once the ink is melted, it is important to begin the inkjet printing promptly in order to reduce the extent to which the pigment separates from the medium in the liquid ink. Once inkjet printing is underway, the flow of the ink along the inkjet path and the process of jetting the ink from the pressure chamber provide agitation of the ink that reduces the extent of separation. Agitation devices and techniques can also be used in reservoirs to reduce the separation. In any case, the controller 22 can be used to control the timing and profile of the phase change of the ink from solid to liquid as desired. The delay that occurs between the time when the phase change from solid to liquid yields a viscosity appropriate for jetting and the moment when the actual jetting begins can be called the "phase change to jetting delay". The phase change jetting delay may vary, but typically should be in the range of 2-10 minutes depending upon the type of heating used, preferably between 2-3 minutes.

Figure 2:
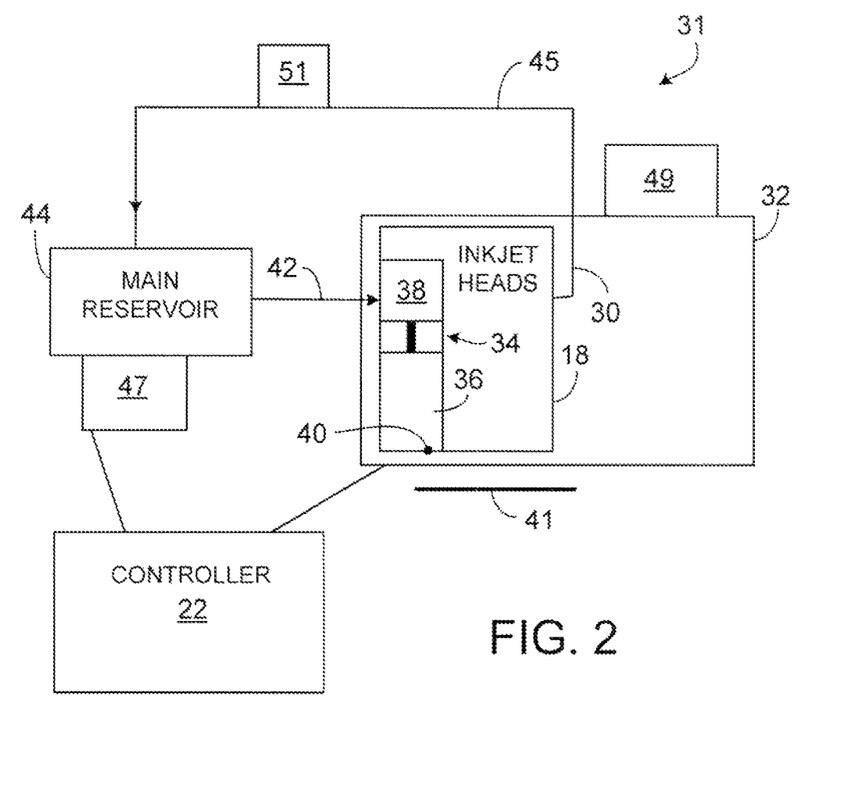
FIG. 2 is a schematic view of ink flow.

The system may be operated in a quiescent mode in which the wax is cooled to just below its melting point, when the system is not being used for a short period of time say a few hours or less. In this way, the system can be more quickly re-started and the system can heat the wax to a good (e.g., optimum) jetting temperature much more quickly than if the wax were cooled to a temperature much lower than its melting point. Ink is jetted at the jetting temperature and is not jetted in the quiescent state. The advantage of holding the system in the quiescent mode includes the use of less power compared to the power required to cool the wax to a temperature much lower than its melting point. In addition, another advantage is the increased ability to keep the ceramic pigments in dispersion compared to when the ceramic wax is held above its melting point As shown in FIG. 2, in some implementations, the inkjet printing system and inkjet devices that make up the printing system together define an ink pathway 31, shown schematically. One part 30 of the ink path proceeds through elements of an inkjet head assembly 32 that includes one or more inkjet heads 18. Each of the inkjet heads can include a number (e.g., a very large number) of inkjets 34. Each inkjet can include a pressurized inkjet chamber 36 that receives a supply of ink from the reservoir 38 and, when pressurized, jets a small volume of the ink through an orifice 40 towards the substrate 41. Ink for jetting can be supplied to the reservoir 38 through a supply line 42 from a larger source or reservoir 44 of ink 46. The reservoir 44, in turn, can be kept loaded by the operator of the ink jet system in a variety of ways.

The ink pathway may also include one or more lines 45 that return excess, surplus, or wasted ink from the reservoir 38, from areas around the orifice, and the from pressurized chambers, for example, to the ink reservoir 44 for reuse. The ink pathway can be thought of as running from the reservoir 44 through the pressurized chambers and back to the reservoir 38.

The ink phase change system of FIG. 1 can comprise a number of components 47, 49, 51 shown schematically FIG. 2 as thermally coupled to respective elements along the inkjet pathway 31.

When two or more colors or pigments or inks are being used for jetting to lay down a pattern, multiple reservoirs 38 and inkjet head assemblies may be used, of course.

Figure 3:
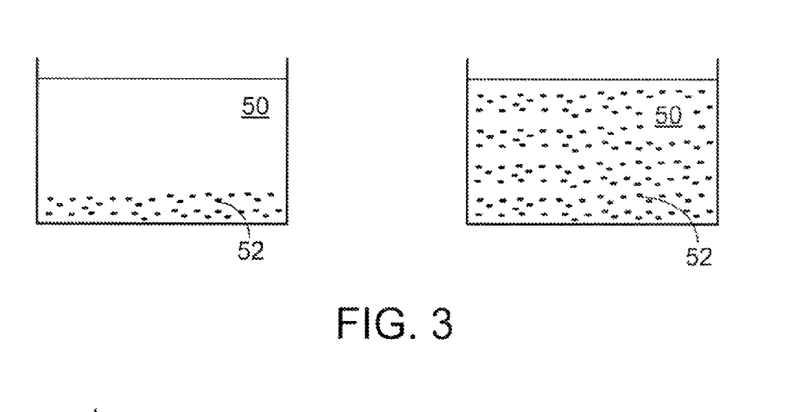
FIG. 3 is a schematic view of ink in two phases.

Referring to FIG. 3, in some examples, when an ink that does not use a phase-changing medium such as wax is not being jetted or actively recirculated along the inkjet path, the dense pigment will tend very quickly to settle within each part of inkjet path, as suggested in the left side of FIG. 3. Later, if jetting were to be started again, there would be no assurance that the dense particles could be caused to be dispersed evenly within the liquid ink. Unless the pigments are evenly dispersed within the liquid ink, the quality of the pattern that is then laid down during subsequent jetting will suffer. Agitating the ink and recirculating the ink during the periods when jetting is not going on may help to keep the pigment dispersed within the medium. Other techniques could also be used.

As shown in FIG. 3, on the right side, if the medium of the ink is a phase-changing material, such as wax, it is possible, by quickly forcing a change of phase from liquid to solid of the wax medium, promptly after jetting has stopped, to entrain the uniformly distributed particles 50 within a matrix of wax 52. Later, before jetting is to begin again, by heating the ink, the matrix becomes liquid and the ink can be successfully jetted again. If the jetting begins promptly after the phase change, the quality of the patterns being laid down can be maintained. On the left side of FIG. 3, by contrast, as time passes while the ink is liquid, the particles 52 separate (e.g., by settling) within the liquid.

Figure 5:
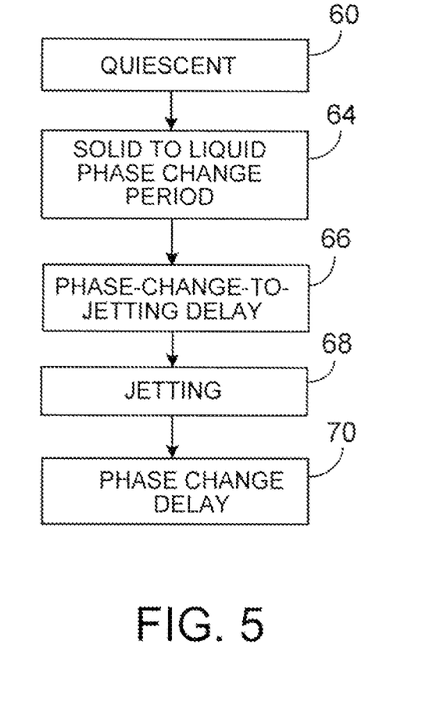
FIG. 5 is a flow diagram.

As shown in FIG. 5, the process of using a pigmented phase change ink for printing can begin when the inkjet printing system is in a quiescent state 60 in which the ink is in a solid phase, the pigment is satisfactorily distributed and entrained within the solid phase, and the conditions are not changing in a way that would cause the phase to change back to liquid. When inkjet printing is to begin, a solid-to-liquid-phase-change period 64 is caused to occur. At the end of period 64, the ink has just reached the condition in which it can be effectively jetted. Subsequently, there is a phase-change-to-jetting delay 66. Generally, delay 66 should be short enough to reduce the tendency of the pigment to become separated in the liquid ink, and can be as short as possible in some examples.

When the jetting 68 for a given jetting process run comes to an end, a phase-change-delay 70 begins. As mentioned before, the length of delay 70 should be short enough to reduce the amount of separation to an acceptable level. Once the delay 70 has ended, the quiescent state 60 is reached again. For example, the length of delay 70 may be shorter than 300 seconds.

Other implementations are within the scope of the following claims.

For example, although some of the examples discussed above relate to inks containing earth pigments for use for printing patterns on ceramic substrates. In addition, wax-based glazing materials could contain particles to be used for providing glazes on ceramic substrates, for example. In such examples, the particles could be large glass particles, frit particles, or other glaze particulates. Such glazing materials could be jetted onto the ceramic substrate before inkjet printing a pattern and often after printing the pattern.

Such wax-based glazing materials could be cooled and/or heated at appropriate times during the processing of the ceramic substrates, in much the same way as we have described for the inks. The wax-based glazing materials can be jetted to form a continuous layer of glaze or could be jetted selectively in a pattern, which can be a large-scale pattern, or a small-scale pattern that achieves a textured appearance on the substrate.

The invention claimed is:

1. A method comprising
   i) providing an inkjet printing system that contains an ink, the ink comprising (a) a pigment and (b) a liquid wax,
   ii) after i), using the inkjet printing system to jet a first portion of the ink onto a substrate while a second portion of the ink remains in the inkjet printing system,
   iii) after ii), heating the first portion of the ink on the substrate to fire the pigment on the substrate, and
   iv) after ii), when the inkjet system is not jetting, actively cooling the second portion of the ink in the inkjet printing system to effect a phase change of the liquid wax within the second portion of the ink from liquid to solid.

2. The method of claim 1 in which the pigment comprises dense particles.

3. The method of claim 1 in which the pigment comprises an earth pigment.

4. The method of claim 1 in which the substrate comprises a material that can be fired in a kiln.

5. The method of claim 4 in which the substrate comprises a ceramic or a glass.

6. The method of claim 1 in which the wax is in a solid phase at room temperature.

7. The method of claim 1 in which the ink is jetted in a pattern comprising at least one of an image, text, or a graphic.

8. The method of claim 1 in which the first portion of the ink on the substrate is heated to a temperature of at least 120° C.

9. The method of claim 1 in which the liquid wax is liquid during the jetting.

10. The method of claim 1, wherein iv) occurs before the pigment within the second portion of the ink has substantially separated from the liquid wax within the second portion of the ink.

11. The method of claim 1 comprising, before ii), causing the wax to change from a solid state to a liquid state.

12. The method of claim 1, wherein the ink is a phase changing jetting ink which comprises (a) (i) particles that have a density of at least 4.5 g/cm³ and that form a fired non-white color when heated on the substrate on which the ink is to be jetted or (ii) particles that have a density of at least 6 g/cm³ and that form a fired white color when heated on a substrate on which the ink is to be jetted, and (b) a medium that changes phase from liquid to solid at a temperature in the range of 40° C. to 120° C.

13. The method of claim 12, in which the particles comprise earth pigments.

14. The method of claim 12, in which the particles comprise at least one of: spinel iron-chromium-zinc, soluble or insoluble gold complexes/salts, tin-chromium oxide, zirconium praseodymium yellow, yellow titanates spinel iron-chrome-zinc-alumina, cobalt-alumina or cobalt-silica and cobalt-chromium-alumina, spinel iron-chromium-cobalt.

15. The method of claim 12, in which the medium comprises wax.

16. The method of claim 1 comprising, after ii) and before the pigment within the first portion of the ink has substantially separated from the liquid wax within the first portion of the ink, holding the liquid wax within the first portion of the ink at a temperature close to but above a melting point of the wax.

17. The method of claim 16, wherein the wax within the first portion of the ink is held in an intermediate state between a liquid phase and a solid phase of the wax.

18. The method of claim 1, wherein actively cooling the second portion of the ink comprises passing a cooling fluid through a conduit in the inkjet printing system.

19. The method of claim 1, wherein actively cooling the second portion of the ink comprises using a fan to blow ambient air onto an inkjet head of the inkjet printing system.

20. The method of claim 1, wherein actively cooling the second portion of the ink comprises using a refrigerant.

21. The method of claim 1, wherein actively cooling the second portion of the ink comprises effecting the phase change of the liquid wax at different times and with different speeds in different parts of the inkjet printing system.

22. The method of claim 1, wherein actively cooling the second portion of the ink comprises cooling the liquid wax to just below its melting point.

23. A method comprising
   i) providing an inkjet printing system which contains one or more inks, each of the inks comprising (a) particles that have a density of at least 4.5 g/cm³ and that will form a corresponding non-white color when fired or particles that have a density of at least 6 g/cm³ and that will form a corresponding white color when fired, and (b) a liquid wax medium that changes phase from liquid to solid at a temperature in the range of 40° C. to 120° C.,
   ii) after i), using the inkjet system to jet a first portion of the one or more inks onto a surface of a ceramic or glass substrate to form a pattern of the one or more inks on the surface of the substrate,
   iii) after ii), heating the substrate to fire the pattern of the first portion of the one or more inks on the surface of the substrate, and
   iv) after ii), when the inkjet printing system is not jetting, actively cooling a second portion of the one or more inks which is in the inkjet printer to effect a phase change of the wax medium within the second portion of the one or more inks from liquid to solid.

24. The method of claim 23 in which the using the inkjet system to jet a first portion of the one or more inks comprises jetting a multi-color pattern of inks.

25. The method of claim 23 in which the particles comprise earth pigments.

26. The method of claim 23 in which the particles comprise at least one of: spinel iron-chromium-zinc, soluble or insoluble gold complexes/salts, tin-chromium oxide, zirconium praseodymium yellow, yellow titanates spinel iron-chrome-zinc-alumina, cobalt-alumina or cobalt-silica and cobalt-chromium-alumina, spinel iron-chromium-cobalt.

27. The method of claim 23 in which iii) comprises heating the substrate in a kiln.

28. The method of claim 23 comprising, before ii), heating the wax medium to change it from a solid phase to a liquid phase.

29. The method of claim 23 comprising, after ii), cooling the wax medium within the second portion of the one or more inks to change it from a liquid phase to a solid phase.

30. The method of claim 23 comprising jetting the same pattern onto a series of substrates, then forcing the medium to change from a liquid state to a solid state within an inkjet system that is doing the jetting, later causing the medium to change from a solid state to a liquid state, and then jetting a different pattern onto a series of substrates.

31. The method of claim 23 comprising, before ii), heating the wax medium within the second portion of the one or more inks to change it from an intermediate state between a solid phase and a liquid phase of the wax to the liquid phase.

32. The method of claim 23, wherein actively cooling the second portion of the one or more inks comprises passing a cooling fluid through a conduit in the inkjet printing system.

33. A method comprising
   i) providing an inkjet printing system which contains an ink that is in a liquid phase and comprises (i) particles that can be fired on the substrate to form a non-white color and have a density of at least 4.5 g/cm$^3$ or (ii) particles that can be fired on the substrate to form a white color and have a density of at least 6 g/cm$^3$, the ink comprising a liquid wax and the particles,
   ii) using the inkjet printing system to jet a first portion of the ink onto a substrate,
   iii) after ii), actively cooling the wax in a second portion of the ink which is in the inkjet to solidify the liquid wax within the second portion of the ink to reduce settling of the particles in the liquid phase,
   iv) after iii), heating the wax within the second portion of the ink to change the wax within the second portion of ink to a liquid phase, and
   v) after iv), using the inkjet printing system to jet the second portion of the ink from the inkjet printing system onto another substrate.

34. The method of claim 33, wherein actively cooling the second portion of the ink comprises using a freezing agent.

35. The method of claim 33, wherein actively cooling the wax within the second portion of the ink comprises passing a cooling fluid through a conduit in the inkjet.

36. A method comprising
   actively cooling a liquid wax in a wax-based ink in an inkjet printing system to solidify the liquid wax within no more than a predetermined period after the inkjet printing system has jetted the wax-based ink onto a substrate.

37. The method of claim 36 in which the predetermined period is less than 300 seconds.

38. The method of claim 36, wherein actively cooling the liquid wax in the wax-based ink in the inkjet printing system to solidify the liquid wax comprises passing a cooling fluid through a conduit in the inkjet printing system.

* * * * *